US009753715B2

United States Patent
Sakai et al.

(10) Patent No.: US 9,753,715 B2
(45) Date of Patent: Sep. 5, 2017

(54) INFORMATION PROCESSING APPARATUS, TERMINAL SYSTEM, STORAGE MEDIUM HAVING STORED THEREIN INFORMATION PROCESSING PROGRAM, AND METHOD OF OBTAINING UPDATE DATA FOR EFFICIENTLY UPDATING DATA FOR AN APPLICATION

(71) Applicant: NINTENDO CO., LTD., Kyoto (JP)

(72) Inventors: Hitoshi Sakai, Kyoto (JP); Eiji Tokunaga, Kyoto (JP); Shinya Ogura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 171 days.

(21) Appl. No.: 14/044,095

(22) Filed: Oct. 2, 2013

(65) Prior Publication Data

US 2014/0137097 A1   May 15, 2014

(30) Foreign Application Priority Data

Nov. 15, 2012  (JP) .................................. 2012-251043
Apr. 12, 2013  (JP) .................................. 2013-084217

(51) Int. Cl.
*G06F 9/445*   (2006.01)
(52) U.S. Cl.
CPC ...................................... *G06F 8/65* (2013.01)
(58) Field of Classification Search
None
See application file for complete search history.

(56) References Cited

U.S. PATENT DOCUMENTS 4,558,413 A * 12/1985 Schmidt et al. ............... 717/170
6,202,207 B1 * 3/2001 Donohue .................. G06F 8/65
　　　　　　　　　　　　　　　　　　　　　705/59

(Continued)

FOREIGN PATENT DOCUMENTS

JP         4-347733 A     12/1992
JP       2004-164115      6/2004

(Continued)

OTHER PUBLICATIONS

"PlayStation(R)3 System Software 4.46 User's Guide Automatic Update", [online], Sony Computer Entertainment Inc., searched on Aug. 22, 2013, Internet http://manuals.playstation.net/document/en/ps3/current/settings/autodownload.html, 1 page.

(Continued)

*Primary Examiner* — Adam Lee
(74) *Attorney, Agent, or Firm* — Nixon & Vanderhye, P.C.

(57) ABSTRACT

In an exemplary information processing apparatus communicable with a server via network, update information is obtained from the server at a first timing and the obtained update information is saved. The update information is information for determining presence of an update of each application. At a second timing independent of the first timing, the information processing apparatus determines whether there is an update to each of at least one of applications stored in a storage unit accessed by the information processing apparatus based on the saved update information. The information processing apparatus obtains, from the server, update data used for updating the application with respect to which it has been determined that the update is present.

21 Claims, 6 Drawing Sheets

(56) References Cited

U.S. PATENT DOCUMENTS

| | | | |
|---|---|---|---|
| 6,289,510 B1* | 9/2001 | Nakajima | G06F 8/67 717/170 |
| 6,301,710 B1* | 10/2001 | Fujiwara | G06F 8/65 707/999.01 |
| 8,166,205 B2* | 4/2012 | Farinacci et al. | 709/249 |
| 8,453,139 B2* | 5/2013 | Tanaka | G06F 9/4403 463/29 |
| 8,812,906 B2* | 8/2014 | Kim et al. | 714/15 |
| 2003/0182414 A1* | 9/2003 | O'Neill | G06F 8/65 709/223 |
| 2004/0031028 A1* | 2/2004 | Hunt | G06F 8/65 717/170 |
| 2004/0088696 A1* | 5/2004 | Kawano | G06F 8/65 717/171 |
| 2004/0158817 A1* | 8/2004 | Okachi | G06F 8/65 717/122 |
| 2005/0160418 A1* | 7/2005 | Jeong et al. | 717/173 |
| 2005/0193387 A1* | 9/2005 | Uramatsu | G06F 8/65 717/170 |
| 2005/0223268 A1* | 10/2005 | Tchen | G06F 8/65 714/6.12 |
| 2005/0262163 A1* | 11/2005 | Seki | G06F 8/65 |
| 2006/0031430 A1* | 2/2006 | Lee | G06F 21/572 709/220 |
| 2007/0169101 A1* | 7/2007 | Konersmann | G06F 8/65 717/170 |
| 2008/0022380 A1* | 1/2008 | Lu | G06F 8/65 726/9 |
| 2008/0141018 A1* | 6/2008 | Tanaka | G06F 9/4403 713/2 |
| 2008/0263540 A1* | 10/2008 | Bando | G06F 8/68 717/173 |
| 2009/0172659 A1* | 7/2009 | Oberg | A63F 13/00 717/178 |
| 2009/0298582 A1* | 12/2009 | Dempsky | A63F 13/12 463/29 |
| 2010/0087181 A1* | 4/2010 | Chen | G06F 8/65 455/418 |
| 2010/0107150 A1* | 4/2010 | Kamada | G06F 8/65 717/170 |
| 2010/0313105 A1* | 12/2010 | Nekoomaram et al. | 714/807 |
| 2010/0317416 A1* | 12/2010 | Tomohara | H04M 1/0235 455/575.4 |
| 2011/0055821 A1* | 3/2011 | Tanaka | G06F 8/65 717/170 |
| 2011/0177866 A1* | 7/2011 | Kim | A63F 13/77 463/42 |
| 2012/0060151 A1* | 3/2012 | Oh et al. | 717/170 |
| 2012/0060157 A1 | 3/2012 | Sekine et al. | |
| 2012/0072895 A1* | 3/2012 | Koyama | G06F 8/65 717/168 |
| 2012/0192170 A1* | 7/2012 | Kobayashi | G06F 8/65 717/168 |
| 2012/0192171 A1* | 7/2012 | Tanaka | G06F 8/66 717/168 |
| 2013/0055271 A1* | 2/2013 | Yoo | G06F 13/22 718/102 |
| 2013/0254274 A1* | 9/2013 | Sun | H04L 67/34 709/203 |
| 2014/0007075 A1* | 1/2014 | Sporkert | G06F 8/68 717/173 |
| 2014/0068587 A1* | 3/2014 | Krishna | 717/169 |

FOREIGN PATENT DOCUMENTS

| | | |
|---|---|---|
| JP | 2008-269394 | 11/2008 |
| JP | 2012-053877 A | 3/2012 |
| JP | 2012-146241 | 8/2012 |
| WO | WO 02/075525 A1 | 9/2002 |
| WO | WO 2008/114491 | 9/2008 |

OTHER PUBLICATIONS

Notice of Reasons for Refusal for Japanese Patent Application No. JP 2013-084219 dated May 27, 2016.

Ito, "Complete Reverse Dictionary of Linux: 555 Secrets for Commands Ver. 2," Shuwa System Co., Ltd., Mar. 29, 2011, first print pp. 522, 535-537 (with translation).

Shimizu, "Foolproof Consumer Preview Released! Unveil Windows 8!!," DOS/V Power Report, Impress Japan Corporation, Mar. 29, 2012, vol. 22, No. 5, pp. 75-84 with partial translation.

Notice of Reasons for Refusal issued in corresponding Japanese Patent Application No. 2013-084217, dated Dec. 7, 2016.

* cited by examiner

F I G. 5
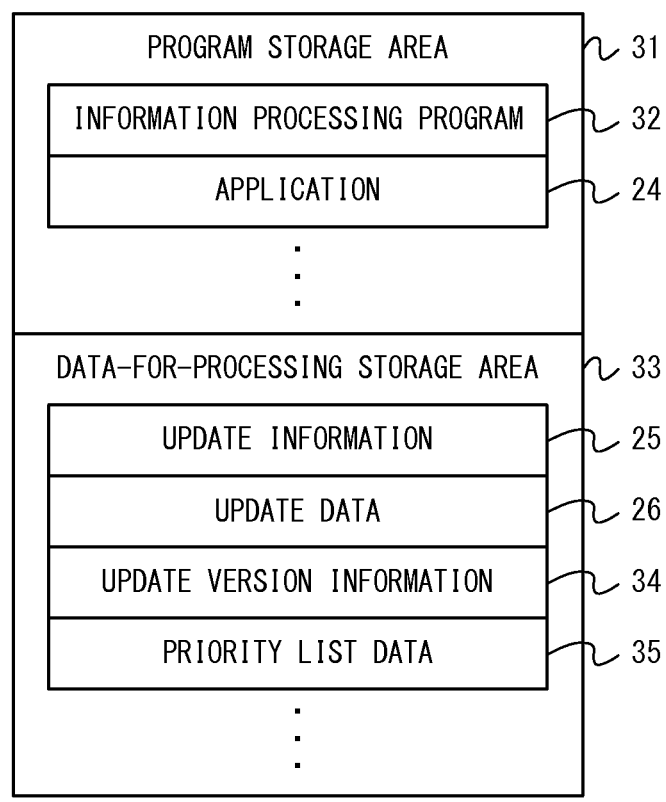

INFORMATION PROCESSING APPARATUS, TERMINAL SYSTEM, STORAGE MEDIUM HAVING STORED THEREIN INFORMATION PROCESSING PROGRAM, AND METHOD OF OBTAINING UPDATE DATA FOR EFFICIENTLY UPDATING DATA FOR AN APPLICATION

CROSS REFERENCE TO RELATED APPLICATION

The disclosures of Japanese Patent Application No. 2012-251043, filed on Nov. 15, 2012 and Patent Application No. 2013-084217, filed on Apr. 12, 2013, are incorporated herein by reference.

FIELD

The present technology relates to an information processing apparatus, a terminal system, a storage medium having stored therein an information processing program for obtaining update data for an application, and a method of obtaining the update data.

BACKGROUND AND SUMMARY

Conventionally, there is a technique for automatically updating an application which is executable by an information processing apparatus. For example, in a conventional game apparatus, application update is executed automatically at a specified time. At this time, the game apparatus performs a series of processes including a process of checking whether application update is necessary, a process of obtaining update data if the update is necessary, and a process of updating the application using the update data in a consecutive manner.

In the conventional technique, the series of processes are consecutively performed, and thus there is a possibility that the processes with regard to updating an application may not be efficiently performed.

Therefore, the present application discloses an information processing apparatus, a terminal system, a storage medium having stored therein an information processing program for efficiently executing application update, and a method of obtaining update data.

(1) An example of the information processing apparatus disclosed in the present specification is an information processing apparatus communicable with a server via a network. The information processing apparatus includes an update information obtaining unit, a first update determination unit, and a first update data obtaining unit. The update information obtaining unit obtains update information for determining presence of an update of each application from the server at a first timing and saves the obtained update information. The first update determination unit determines, for each of at least one of applications stored in a storage unit which can be accessed by the information processing apparatus, whether there is an update at a second timing independent of the first timing based on the saved update information. The first update data obtaining unit obtains, from the server, update data used for updating the application with respect to which the first update determination unit has determined that the update is present.

In the above description, to "obtain update information from the server at a first timing" means both that the update information is obtained always at the first timing and that the update information is obtained as necessary (for example, when a new piece of update information is present as in the exemplary embodiment described later) at the first timing.

According to the configuration of (1) described above, the information processing apparatus performs an update information obtaining process and an update data obtaining process at independent timings. Accordingly, the information processing apparatus can efficiently confirm a presence of an update of each application and (when the update is present) obtain update data.

(2) The information processing apparatus may further include a first timing determination unit and a second timing determination unit. The first timing determination unit determines whether the first timing has come based on whether a predetermined first condition is satisfied. The second timing determination unit determines whether the second timing has come based on whether a second condition different from the first condition is satisfied. In this case, the first update determination unit makes a determination when the second timing determination unit has determined that the second timing has come.

According to the configuration of (2) described above, whether the second timing has come is determined based on a condition different from that of the first timing. Thus, it is made possible to appropriately determine a timing of determining presence of an update.

(3) The update information obtaining unit may obtain update information for determining presence of updates of a plurality of applications from the server. The first update determination unit may determine whether there is an update to one of the applications.

According to the configuration of (3) described above, while the update information is obtained for a plurality of applications collectively at one time, presence of an update is determined for each application individually. Thus, the number of times of performing the obtaining process can be reduced by collectively obtaining the update information, and the determination process can be efficiently performed by determining presence of an update for each application.

(4) The first timing may be caused by a user performing a predetermined first operation. The second timing may be caused by the user performing a predetermined second operation different from the first operation.

According to the configuration of (4) described above, the first timing and the second timing arrive (are caused) respectively in accordance with the operations performed by the user. Thus, the information processing apparatus need not measure a timing which arrives periodically, and thereby processes with regard to an update (processes of obtaining the update information, obtaining the update data, and the like) can be easily performed.

(5) The first timing may be between start-up of the information processing apparatus and issuance of an instruction to start the application stored in the storage unit.

According to the configuration of (5) described above, the information processing apparatus can obtain a new piece of update information before the application is started. Thus, the information processing apparatus can determine presence of an update for the application before executing the application and update the application as necessary.

(6) The first timing may be based on a process of displaying a menu image with which the user can issue an instruction to start the application stored in the storage unit.

According to the configuration of (6) described above, the update information is obtained at a timing based on a timing at which the menu image is displayed. Because the menu image is displayed at a certain frequency, the information processing apparatus can obtain the update information at an appropriate frequency. Thus, it is made possible to reduce possibility that the application cannot be updated to the latest version as a consequence of that the update information obtaining process is too infrequent to obtain the latest update information, for example.

(7) The second timing is in response to an instruction to start the application stored in the storage unit having been issued, and the first update determination unit may determine, at the second timing, whether there is an update to the application with respect to which the instruction to start has been issued.

According to the configuration of (7) described above, the information processing apparatus obtains the update data when the application is started. Thus, the update data for an application which may or may not be used (executed) is not obtained, and thereby it is made possible to obtain the update data efficiently. Further, because the information processing apparatus obtains the update information in advance at the first timing prior to the second timing, the update information need not be obtained when an application is started. Accordingly, a time from an instruction to start an application to execution of the application can be reduced, thereby reducing a wait time of the user until the application is started.

(8) The first update data obtaining unit may obtain update data, for the application with respect to which it has been determined that the update is present, before the application is started. In this case, the information processing apparatus may further include a first application execution unit. When an instruction to start the application stored in the storage unit is issued, the first application execution unit executes the application onto which the update using the update data has been reflected.

According to the configuration of (8) described above, the information processing apparatus updates the application before executing the application. Thus, the user can use a new version of the application after being updated.

(9) The update information obtaining unit may obtain and save update information together with update version information representing a version of the update information, and when the first timing arrives next time, obtain the update version information from the server and determine whether or not to obtain the update information based on the obtained update version information.

According to the configuration of (9) described above, the information processing apparatus determines whether or not to obtain the update information using the update version information obtained from the server. Thus the update information can be obtained efficiently.

(10) The update information obtaining unit may obtain update information for one or more applications set in the server regardless of whether the applications are stored in the storage unit.

According to the configuration of (10) described above, when the server which transmits the update information is requested by the information processing apparatus to transmit the update information, the server need not determine with respect to which application the server should transmit the update information. According to the configuration of (10) described above, it is made possible to reduce a processing load on the server.

(11) The update information obtaining unit may obtain the update information from the server which can provide the information processing apparatus with at least one of the update data and an application executable by the information processing apparatus.

According to the configuration of (11) described above, the server which provides the update information of an application provides the update data for the application and/or the application itself. Thus, when there are any additions and/or changes to the application to be provided, management of the application is facilitated.

(12) The information processing apparatus may further include a second update determination unit and a second update data obtaining unit. The second update determination unit determines, in response to update information having been obtained and regardless of whether the second timing has come, whether there is an update to an application which satisfies a predetermined condition among the applications stored in the storage unit, based on the update information. The second update data obtaining unit obtains, from the server, update data used for updating the application with respect to which the second update determination unit has determined that the update is present.

According to the configuration of (12) described above, in case of a predetermined application, presence of an update is determined regardless of the second timing, and update data is obtained when the update is present. Thus, in the case of the predetermined application, because the information processing apparatus need not obtain the update data after the second timing, a time taken from the second timing to execution of the application can be reduced.

(13) The second update determination unit may determine an application which satisfies the predetermined condition based on an execution history of each application stored in the storage unit.

According to the configuration of (13) described above, in case of an application which is highly likely to be executed, the update data is obtained in advance prior to the second timing. Thus, in case of such an application, there is no need to obtain the update data during a time period from the second timing and the execution of the application, and thereby the time period can be shortened.

(14) The second update data obtaining unit may obtain update data regardless of whether an application other than an application corresponding to the update data is being executed in the information processing apparatus.

According to the configuration of (14) described above, the information processing apparatus obtains update data even when an application other than a predetermined application corresponding to the update data is being executed. Thus, even when the update data for the predetermined application is obtained, the user can use at least the other application.

(15) The information processing apparatus may further include a second application execution unit which executes, when an instruction to start the application with respect to which the second update determination unit has determined that the update is present is issued, the application onto which the update using the update data has been reflected.

According to the configuration of (15) described above, in case of the predetermined application, the user can use the new version of the application after being updated.

(16) The update information obtaining unit may obtain update information for determining presence of updates of a plurality of applications from the server. The first update determination unit may determine whether there is an update to each of a part of the plurality of applications represented by the update information.

According to the configuration of (16) described above, while the update information is obtained for a plurality of applications collectively at one time, presence of an update is determined for each of only a part of the applications. By thus obtaining the update information collectively, the number of times of performing the obtaining process can be reduced while the determination process can be performed efficiently by determining the presence of the update for each of only the part of the applications.

(17) The second timing may be in response to the information processing apparatus having shifted to a non-use mode.

According to the configuration of (17) described above, because the update data is obtained in the non-use mode, there is no need for the user to wait (no need to wait until the update data is obtained), and the update data can be obtained at an appropriate timing.

(18) The first update determination unit may determine whether there is an update to each of one or more applications selected, based on the respective execution histories stored in the storage unit, from among the applications stored in the storage unit which can be accessed by the information processing apparatus.

According to the configuration of (18) described above, presence of an update is determined for an application which is highly likely to be used, and thus the update data can be obtained efficiently.

It is noted that the present specification discloses an information processing system having the same functions as those of the respective components of the information processing apparatuses in the above (1) to (18), and discloses a storage medium having stored therein an information processing program which causes a computer of the information processing apparatuses to perform the same processes as those of the respective components. Furthermore, the present specification discloses a method of obtaining update data performed in the above (1) to (18).

According to the information processing apparatus, terminal system, storage medium having stored therein an information processing program, and the method of obtaining data for updating an application described above, update information and update data are obtained at independent timings. Thus it is made possible to efficiently check presence of an update of an application and (if there is the update) obtain the update data.

These and other objects, features, aspects and advantages of the exemplary embodiment will become more apparent from the following detailed description when taken in conjunction with the accompanying drawings.

BRIEF DESCRIPTION OF THE DRAWINGS

FIG. 5 is a diagram illustrating a non-limiting example of a data area set in a storage unit of a terminal system.

DETAILED DESCRIPTION OF NON-LIMITING EXAMPLE EMBODIMENTS

[1. Configuration of Information Processing System]

Figure 1:
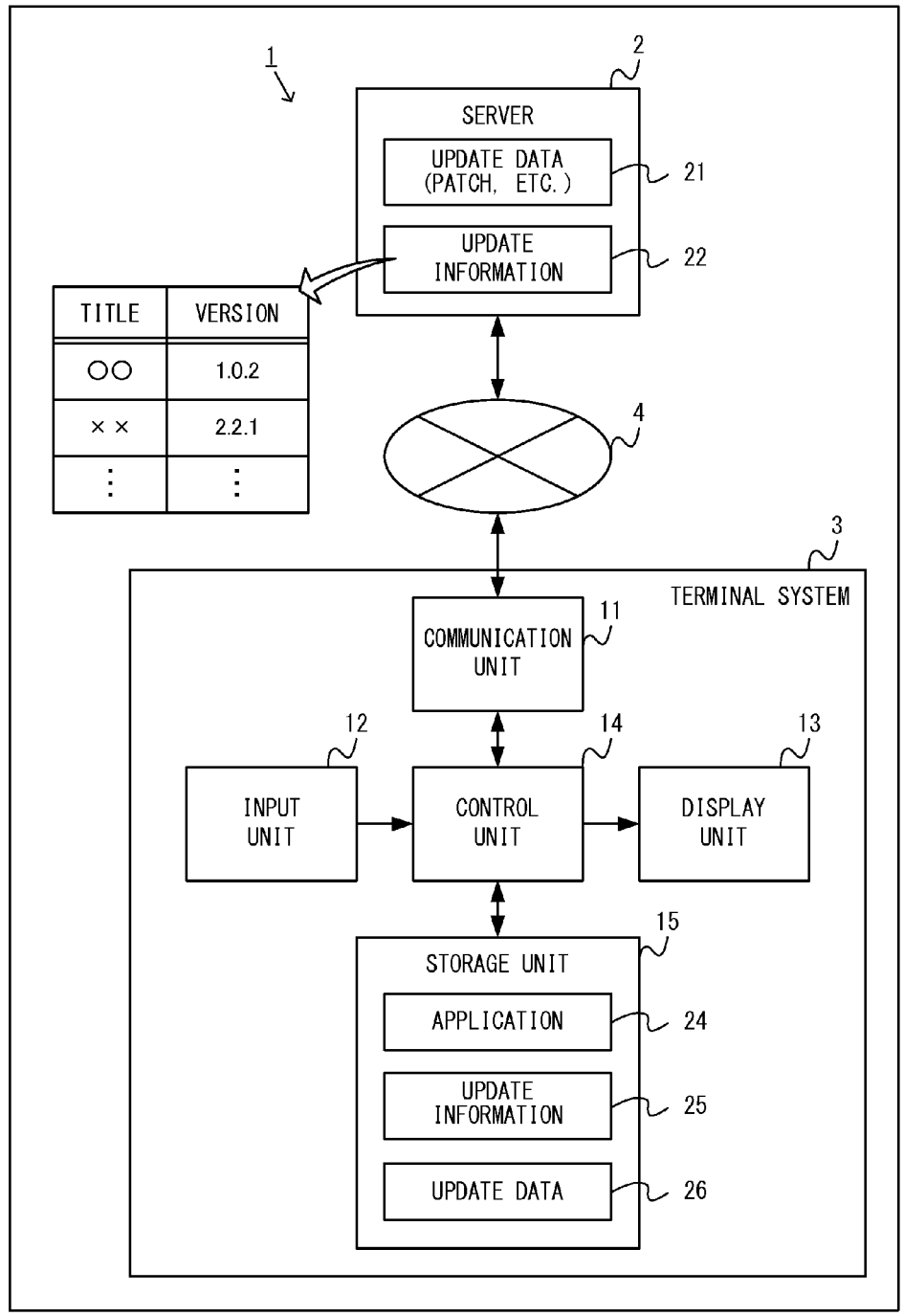
FIG. 1 is a block diagram illustrating a non-limiting example of a configuration of an information processing system.

In the following, an information processing apparatus, an information processing system, an information processing program, and a method of obtaining data for updating an application according to the exemplary embodiment will be described. First of all, a configuration of the information processing system will be described. FIG. 1 shows a block diagram illustrating a configuration of the exemplary information processing system. As shown in FIG. 1, an information processing system 1 includes a server 2 and a terminal system 3. The terminal system 3 is communicable with the server 2 via a network 4. In the information processing system 1, update data (e.g., a patch) relative to the application executed by the terminal system 3 is provided to the terminal system 3 via the server 2.

The server 2 stores therein various information (update data 21 and update information 22) to be provided to the terminal system 3. The server 2 includes one or more information processing apparatuses (server apparatuses). For example, a server apparatus may be provided for each of update data 21 and update information 22. A server apparatus also may be provided for each application. In these cases, a group of the server apparatuses is referred to as server 2.

As shown in FIG. 1, the server 2 stores the update data 21. The update data 21 is data used for updating an application. The update data 21 is, for example, patch data to make corrections and/or additions to an application, additional data to be used in an application, or the like. In the exemplary embodiment, the server 2 stores the update data 21 for each of a plurality of applications.

Further, the server 2 stores the update information 22. The update information 22 is information for determining presence of an update for each application. In the exemplary embodiment, the update information 22 is transmitted from the server 2 to the terminal system 3, as will be described later in detail. The terminal system 3 determines presence of an update for an application used by itself based on the update information 22 transmitted from the server 2. Then, for the application with respect to which it has been determined that the update is present, the update data 21 is transmitted from the server 2, and thereby the application is updated in the terminal system 3.

In the exemplary embodiment, the update information 22 represents application identification information (to be specific, title information) associated with information indicating a version of an application (version information) (see FIG. 1). The update information 22 may be any information with which the terminal system 3 can determine presence of an update for each application. For example, the update information may be information of a flag indicating presence of an update for each application. Further, the version information may be a number indicating a version or information indicating date and time (time stamp) of the latest update.

In the exemplary embodiment, the server 2 is a server (e.g., a shop server) which offers a service to provide an application relative to the update information 22 and the update data 21. That is, the server 2 provides the terminal system 3 with an application, and further provides the terminal system 3 with the update information 22 and the update data 21 relative to the application. Accordingly, although it is not shown, the server 2 stores the application itself relative to the update information 22 and the update data 21. In another exemplary embodiment, the server 2 may not necessarily store the application itself. An application may be provided to the terminal system 3 by any method, and may be provided to the terminal system 3 by, for example, a portable storage medium.

The terminal system 3 is an information processing apparatus (information processing system) which executes an application. The terminal system 3 includes one or more information processing apparatuses. The terminal system 3 may be implemented as a single information processing apparatus (e.g., a game apparatus), or may include a main information processing apparatus which performs main information processing, an input unit, and a terminal device having a display unit. In another exemplary embodiment, at least a part of information processes performed by the terminal system 3 may be shared and performed by a plurality of apparatuses communicable with each other via a network (wide area network and/or local network).

The terminal system 3 includes a communication unit 11. The communication unit 11 transmits/receives data to/from the server 2 via the network 4. Further, the terminal system 3 includes an input unit 12. The input unit 12 may be any input device which receives inputs from a user via buttons (keys), a touch panel, a mouse, and/or the like. Further, the terminal system 3 includes a display unit 13. The display unit 13 displays an image generated by the information processing performed in the terminal system 3.

The terminal system 3 includes a control unit 14. The control unit 14 performs various information processes to be performed in the terminal system 3. Specifically, the control unit 14 has a CPU (and a memory), and the CPU executes a predetermined information processing program, thereby performing the various information processes.

The terminal system 3 includes a storage unit 15. The storage unit 15 may be any storage apparatus (storage medium) which can be accessed by the information processing apparatus (here, the control unit 14) of the terminal system 3. The storage unit 15 may be a storage apparatus built in the information processing apparatus or a storage apparatus detachably attached to the information processing apparatus, or may include both of these storage apparatuses.

In the exemplary embodiment, the storage unit 15 stores an application 24. The application 24 is software executable by the control unit 14. The application 24 may be any type of application, such as a game application and the like. As described above, the application 24 may be provided to the terminal system 3 from the server 2 or may be provided by any other method. Further, the storage unit 15 stores update information 25. The update information 25 is obtained from the server 2 and saved in the storage unit 15.

In the exemplary embodiment, the storage unit 15 stores update data 26. The update data 26 is obtained from the server 2 and saved in the storage unit 15. When an application is executed in the exemplary embodiment, the terminal system 3 uses the application 24 before being updated and the update data 26. It should be noted that when the application after being updated is stored in the storage unit 15 in place of the application before being updated, the update data is not necessarily saved.

[2. Outline of Operation]

Figure 2:
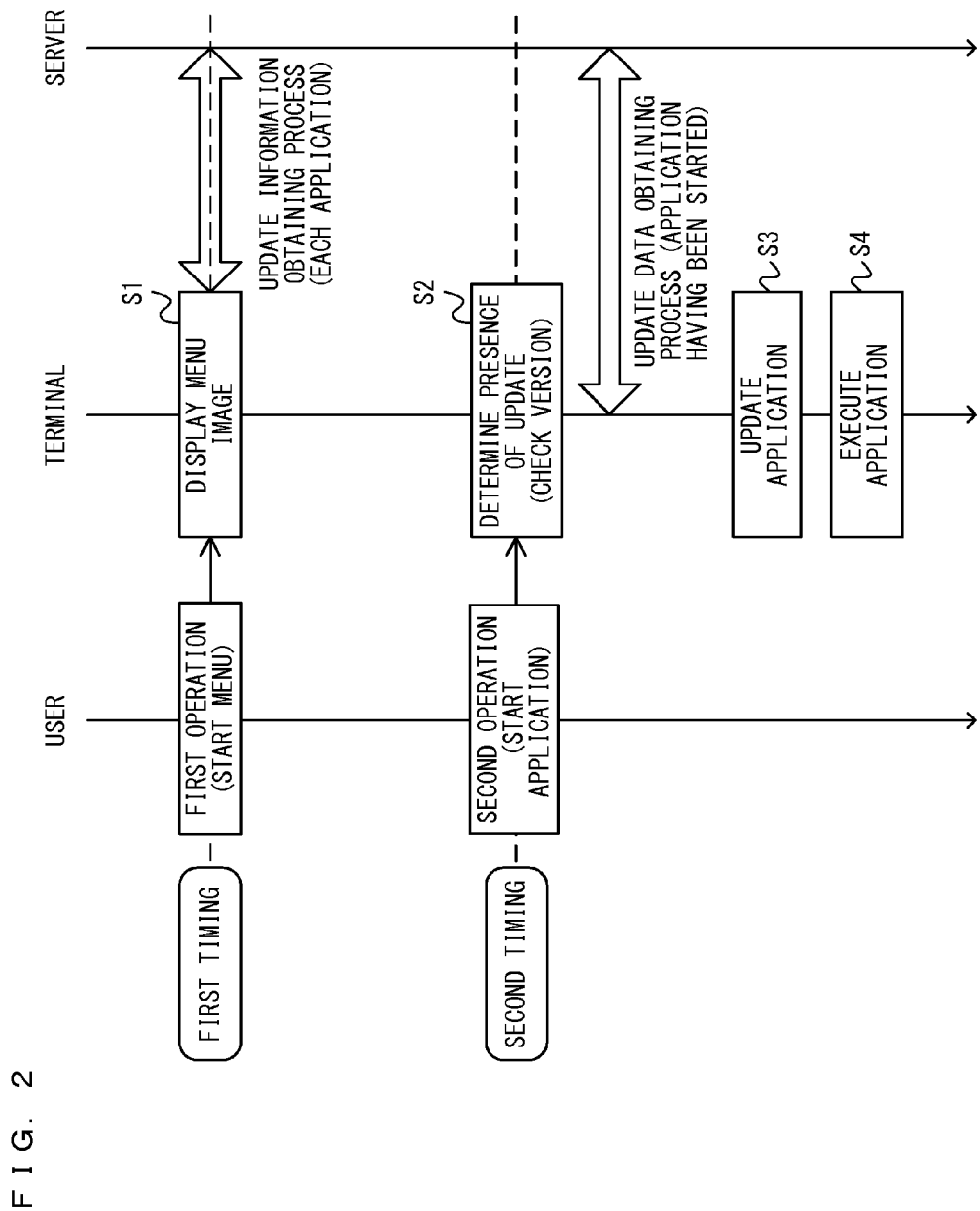
FIG. 2 is a diagram illustrating a non-limiting example of an operation performed in the information processing system.

Next, an outline of an operation performed in the information processing system 1 will be described. FIG. 2 is a diagram illustrating an example of the operation performed in the information processing system 1. As shown in FIG. 2, in the information processing system 1, an update information obtaining process and an update data obtaining (and application updating) process are performed at different timings (timings independent of each other).

(2-1: Process Flow from Obtaining Update Information to Updating Application)

As shown in FIG. 2, the control unit 14 of the terminal system 3 firstly performs the update information obtaining process at a first timing. That is, in the update information obtaining process, the terminal system 3 obtains update information from the server and saves the obtained update information in the storage unit 15. In the exemplary embodiment, as will be described later in detail, the first timing is in response to a menu image being displayed on the display unit 13 in accordance with a first operation performed by the user (step S1). That is, the control unit 14 determines whether the first timing has come based on whether a predetermined first condition (that the menu image is displayed) is satisfied.

Next, the terminal system 3 determines whether there is an update to a single application stored in the storage unit 15 at a second timing independent of the first timing (step S2 shown in FIG. 2). That is, the terminal system 3 determines whether the second timing has come based on whether a second condition different from the first condition is satisfied. When it has been determined that the second timing has come, the terminal system 3 determines the presence of the update. In the exemplary embodiment, the second condition is that an instruction to start the application has been issued, and the second timing is in response to the instruction to start the application having been issued. That is, when the user performs a second operation for starting the application, the terminal system 3 determines the presence of the update for the application which the user has instructed to start.

The presence of the update is determined based on the update information obtained in the previously performed update information obtaining process. When a determination result is that the update is present, the update data obtaining process is performed (see FIG. 2). That is, the terminal system 3 obtains, from the server 2, update data which is used for updating the application with respect to which it has been determined that the update is present.

When the update data is obtained, the terminal system 3 updates the application (step S3). That is, the terminal system 3 updates the application stored in the storage unit 15 using the update data. Further, in the exemplary embodiment, the terminal system 3 executes the application onto which the update using the update data has been reflected (step S4). Accordingly, the user can use a new version (ideally, the latest version) of the application after being updated.

As described above, in the exemplary embodiment, the terminal system 3 performs the update information obtaining process and the update data obtaining process at different timings. Thus, the terminal system 3 can efficiently confirm the presence of the update of the application and (when the update is present) obtain the update data. As will be described later in detail, by setting the first timing and the second timing appropriately, it is made possible to prevent acquisition of update data for an application which need not be updated immediately, for example.

(2-2: First Timing and Second Timing)

In the following, the first timing at which the update information obtaining process is performed and the second timing at which the update data obtaining process is performed will be described in detail. The first timing is independent of the second timing at which the update data obtaining process is performed. Here, that "the first timing is independent of the second timing" means that a time at which the second timing arrives is independent of a time at which the first timing arrives (the second timing is not determined based on the first timing). Further, the second timing does not necessarily occur in response to occurrence of the first timing The first timing and the second timing are independent of each other, and thus confirmation of presence of an update of an application and acquisition of the update data can be made efficiently as described above.

As described above, the first timing in the exemplary embodiment is a timing in response to the menu image being displayed on the display unit 13. Here, the menu image is an image with which the user can give an instruction to start (at least some of) applications stored in the storage unit 15. For example, the menu image includes icons representing the respective applications and execution of an application is started by the user performing an input for designating an icon representing the application. In the exemplary embodiment, the menu image is displayed in accordance with the first operation of the user (see FIG. 2). Specifically, the terminal system 3 is started in accordance with the first operation (start operation) performed by the user. Upon start-up of the terminal system 3, the menu image is displayed on the display unit 13.

It should be noted that the first timing and the timing of displaying the menu image are not necessarily coincident with each other. The update information obtaining process may be performed at a timing based on the timing at which the menu image is displayed. In the exemplary embodiment, the update information obtaining process is started when a preparation process for displaying the menu image is being performed. Accordingly, the update information obtaining process may be completed at a time at which the menu image is displayed, or may be completed shortly after the menu image is displayed As described above, in the exemplary embodiment, the first timing is based on a process of displaying the menu image. Generally, the menu image is displayed at a certain frequency when the terminal system 3 is used. Thus, by performing the update information obtaining process at a timing of the process of displaying the menu image, the obtaining process can be performed at an appropriate frequency. Accordingly, it is made possible to reduce possibility that the application cannot be updated to the latest version as a consequence of that the update information obtaining process is too infrequent to obtain the latest update information. Further, in a case where the menu image is displayed in response to start-up of the terminal system 3 as in the exemplary embodiment, the update information obtaining process can be performed at least once each time the terminal system 3 is started up, and thereby the obtaining process can be performed at an appropriate frequency.

Further, when the menu image is displayed, there may be cases where various information processes (for example, an initialization process performed when the terminal system 3 is started up, and the like) are performed in the terminal system 3. In such a case, the update information obtaining process is performed during a wait time until the menu image is displayed, and thereby the update information can be obtained without making the user conscious of the update information obtaining process. Accordingly, the user need not be aware of a wait time due to the update information obtaining process, and thereby the user can use the terminal system 3 with more comfort.

Further, in the exemplary embodiment, the menu image is displayed in response to the start-up of the terminal system 3, and the user issues an instruction to execute the application while the menu image is being displayed. Accordingly, it can be said that the first timing is between the start-up of the terminal system 3 and issuance of the instruction to execute the application. Thus, the update information can be updated before the application is executed. At this time, the application can be updated to a new version when the terminal system 3 is started up by, for example, determining (confirming) presence of the update and obtaining the update data before the application is started.

It should be noted that the first timing may be any timing independent of the second timing. In another exemplary embodiment, the first timing may be, for example, a timing in response to the start-up of the terminal system 3 (regardless of whether the menu image is displayed). Further, the first timing may be, for example, a timing at which an application (so-called shop application) for obtaining applications by accessing a server which provides the applications is started. Further, the first timing may be, for example, a timing at which a predetermined time has come. That is, the terminal system 3 may perform the update information obtaining process at a timing at which the predetermined time has come. The update information obtaining process can be performed at an appropriate frequency also when the first timing is any of these timings.

Further, in the exemplary embodiment, the second timing is in response to an instruction to start an application stored in the storage unit 15 being issued as described above. That is, when the application is used, the terminal system 3 obtains the update data relative to the application. Thus, the update data for an application which may or may not be used is not obtained, and thereby it is made possible to obtain the update data efficiently. Further, in the exemplary embodiment, because the terminal system 3 obtains the update information in advance at the first timing prior to the second timing, the update information need not be obtained when the application is started. Accordingly, a time taken from an instruction to start an application to execution of the application can be reduced, thereby reducing a wait time until the application is started. In another exemplary embodiment, the second timing may be any timing independent of the first timing.

As described above, in the exemplary embodiment, the first timing is caused by the user performing a predetermined first operation (a start operation of the terminal system 3). The second timing is caused by the user performing a predetermined second operation different from the first operation. Accordingly, by setting the timings in accordance with the respective user's operations, the terminal system 3 need not measure the timings which arrive periodically, and thereby processes with regard to an update (processes of obtaining the update information, obtaining the update data, and the like) can be easily performed.

(2-3: Update Information Obtaining Process)

Figure 3:
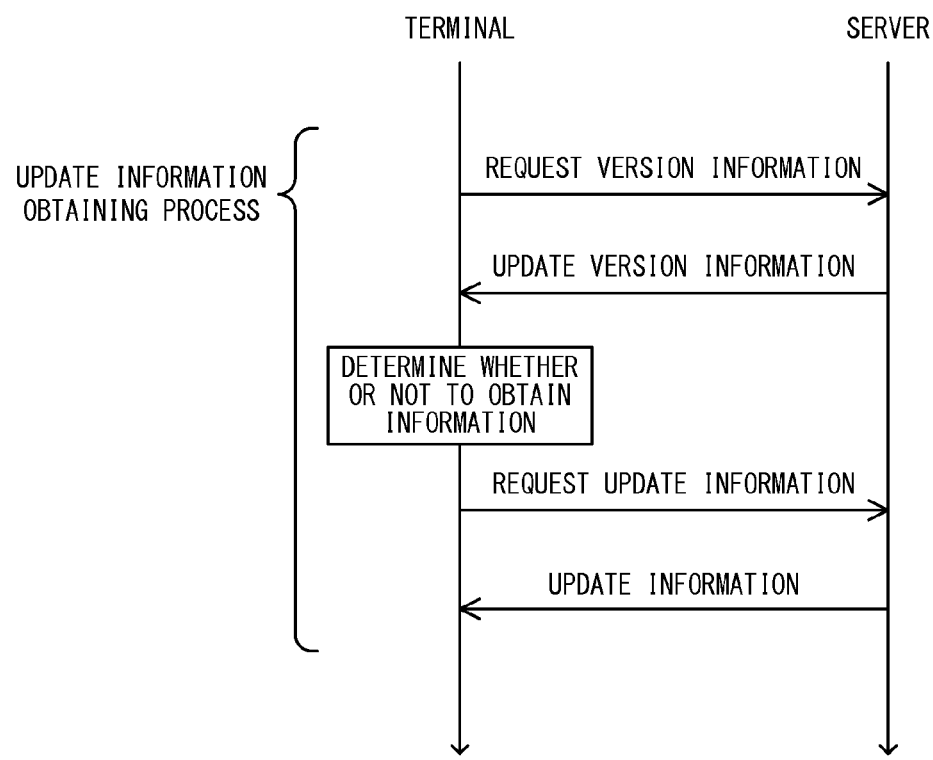
FIG. 3 is a diagram illustrating a non-limiting example of an operation performed in an update information obtaining process.

Next, the update information obtaining process will be described. FIG. 3 is a diagram illustrating an example of an operation performed in the update information obtaining process. At this time, in the exemplary embodiment, the terminal system 3 uses the update version information in order to determine whether the update information 25 saved therein coincides with the (latest) update information 22 in the server 2. The update version information represents a version of the update information. For example, the update version information may be a version number, or date and time (time stamp) of the update.

As shown in FIG. 3, in the update information obtaining process, the terminal system 3 firstly requests the server 2 to transmit the update version information. In response to the request, the server 2 transmits the update version information corresponding to the latest update information to the terminal system 3. Next, the terminal system 3 determines whether or not to obtain the update information from the server 2. That is, the terminal system 3 compares the update version information received from the server 2 and the current update version information of its own. "The current update version information of its own" is the update version information corresponding to the update information 25 stored in the terminal system 3. "The current update version information of its own" is obtained in the previously performed update information obtaining process, and saved in the storage unit 15. When a result of comparing the two pieces of update version information indicates that these pieces of update version information are not coincident with each other, the terminal system 3 determines that the update information need be obtained. Then, the terminal system 3 requests the server 2 to transmit the update information. In response to the request, the server 2 transmits the latest update information to the terminal system 3. The terminal system 3 receives the update information from the server 2 and saves the update information in the storage unit 15. Meanwhile, when the result of the comparing the two pieces of update version information indicates that they are coincident with each other, the terminal system 3 determines that the update information need not be obtained. In this case, the terminal system 3 does not obtain the update information.

As described above, in the exemplary embodiment, the terminal system 3 obtains and saves the update version information together with the update information. Then, when the first timing arrives next time, the terminal system 3 obtains the update version information from the server and determines whether or not to obtain the update information based on the obtained update version information. Accordingly, because the terminal system 3 does not bother to obtain the update information which is the same as the one saved in the terminal system 3, it is made possible to obtain the update information efficiently.

It should be noted that, in another exemplary embodiment, the terminal system 3 may firstly transmit the current update version information of its own to the server 2, and the server 2 may determine whether or not to transmit the update information based on the update version information received from the terminal system 3. Thus, similarly to the exemplary embodiment, it is made possible to obtain the update information efficiently. In another exemplary embodiment, the terminal system 3 may obtain the update information always at the first timing without obtaining the update version information.

Further, as described above, the server 2 of the exemplary embodiment is a server (e.g., a shop server) for offering a service to provide an application. Here, the server 2 transmits the update information relative to all of applications which the server 2 can provide to the terminal system 3. That is, in the exemplary embodiment, the update information contains the identification information (title) and the version information of all of the applications. In the exemplary embodiment, also in a case where a plurality of terminal systems communicable with the server 2 exist, the server 2 transmits a single type of update information to each terminal system.

As described above, in the exemplary embodiment, the terminal system 3 obtains the update information relative to one or more applications set in the server 2 regardless of the applications stored in the storage unit 15. Thus, when the terminal system requests the server 2 to transmit the update information, the server 2 need not determine with respect to which application the update information should be transmitted. According to the exemplary embodiment, it is made possible to reduce a processing load on the server 2.

Further, in the exemplary embodiment, the server 2 which provides the update information to the terminal system 3 can provide the terminal system 3 with an application executable by the terminal system 3 and the update data. Accordingly, when there are any additions and/or changes to an application to be provided, management of the application on the server 2 is facilitated. By providing at least two of the application, the update data, and the update information, management of the application can be facilitated when there are any additions and/or changes to the application.

(2-4: Determination of Presence of Update to Application)

Next, determination of presence of an update of an application will be described. In the exemplary embodiment, the presence of the update is determined based on the version information contained in the update information obtained from the server 2 and the current version information of the application (subject to the determination). Specifically, the terminal system 3 compares the current version information of the application to be started and the version information of the application contained in the update information. When a result of the comparison indicates that these pieces of version information are not coincident with each other, the terminal system 3 determines that the update is present. Meanwhile, when the result indicates that these pieces of version information are coincident with each other, the terminal system 3 determines that there is no update. It should be noted that version information of its own is given to the application and the update data provided to the terminal system 3. The terminal system 3 stores the latest piece of version information attached to the application or the update data provided thereto as the above "current version information", and thereby compares two pieces of information as described above. In another exemplary embodiment, a specific method of the above determination may be any method. For example, when the update information is a flag representing presence of an update for each application, the terminal system 3 uses information represented by the flag and makes the determination as described above.

Further, in the exemplary embodiment, the presence of the update is determined for an application which the user has instructed to start. That is, the presence of the update is determined for a single application. Accordingly, in the exemplary embodiment, while the update information is obtained for a plurality of applications collectively at one time, the presence of the update is determined for each application individually. By thus obtaining the update information collectively, the number of times of performing the obtaining process can be reduced while efficiently performing the determination process by determining the presence of the update of each application.

(2-5: Update Data Obtaining Process)

Next, the update data obtaining process will be described. In the exemplary embodiment, in the update data obtaining process, the terminal system 3 firstly requests the server 2 for the update data via the communication unit 11. Specifically, the terminal system 3 transmits, to the server 2, information which contains identification information (title and the like) of the application and represents the request for the update data. Upon receipt of the request for the update data from the terminal system 3, the server 2 identifies the application corresponding to the request, and transmits the update data corresponding to the application to the terminal system 3. The terminal system 3 receives (obtains) the update data transmitted from the server 2 and stores the update data in the storage unit 15.

In the exemplary embodiment, the presence of the update is determined for each individual application and the update data is obtained for the individual application. Thus, it is made possible to perform the update data obtaining process efficiently.

Further, in the exemplary embodiment, when the update data is transmitted to the terminal system 3, the server 2 may transmit the latest update data regardless of the version information of the application in the terminal system 3. At this time, when a new piece of update data is generated in the server 2 between the first timing and the second timing, the update information in the terminal system 3 does not correspond to the new piece of update data. However, even in such a case, because the server 2 transmits the latest update data, the application can be updated to the latest version in the terminal system 3.

It should be noted that the terminal system 3 may confirm whether or not to update an application before performing the update data obtaining process. For example, the terminal system 3 may display a message indicating "there is an update. would you like to update?" on the display unit 13. Then, when the user issues an instruction to update the application, the terminal system 3 may perform the update data obtaining process to update the application. Meanwhile, when the user issues an instruction not to update the application, the terminal system 3 may not perform the update data obtaining process.

(2-6: Update of Application)

Next, an update of an application using update data will be described. When update data relative to a certain application is obtained, the terminal system 3 updates the application using the obtained update data. Here, "an update of an application" in the present specification means both that a program of the original application is actually updated and that the application having been updated is made ready to be executed. In the former case, the terminal system 3 may update the original application using the update data and store the application after being updated in the storage unit 15. In the latter case, the terminal system 3 may store the application and the update data separately in the storage unit 15, and execute the application using the original application and the update data when the application is started. Further, in the latter case, the terminal system 3 may perform a process for updating the application using the update data each time the application is started.

The timing at which the application is updated may be ay timing after the update data obtaining process. In the exemplary embodiment, the application is updated following the update data obtaining process. In another exemplary embodiment, acquisition of the update data may not be followed by updating the application.

Further, in the exemplary embodiment, the application is updated before the application is executed (see FIG. 2). That is, when the application has been updated, the terminal system 3 executes the application after being updated. Thus, in the exemplary embodiment, for an application with respect to which it has been determined that the update is present, the terminal system 3 obtains the update data before the application is started, and executes the application onto which the update has been reflected using the update data. According to the exemplary embodiment, because the application onto which the update has been reflected is executed, the user can use a new version (ideally, the latest version) of the application after being updated.

(2-7: Process of Obtaining Update Data at Another Timing)

As described above, in the exemplary embodiment, presence of an update of an application is determined basically at the second timing different from the first timing. In the exemplary embodiment, however, with respect to a predetermined application (hereinafter referred to as a "preferred application") among the applications stored in the storage unit 15, the presence of the update is determined following the first timing (following acquisition of the update information). Then, when it has been determined that the update is present, the update data obtaining process is performed subsequently. That is, in the exemplary embodiment, the terminal system 3 obtains the update data relative to the preferred application in advance before the preferred application is started, thereby reducing a time required when the application is started. In the following, an operation relative to updating the preferred application will be described in detail.

Figure 4:
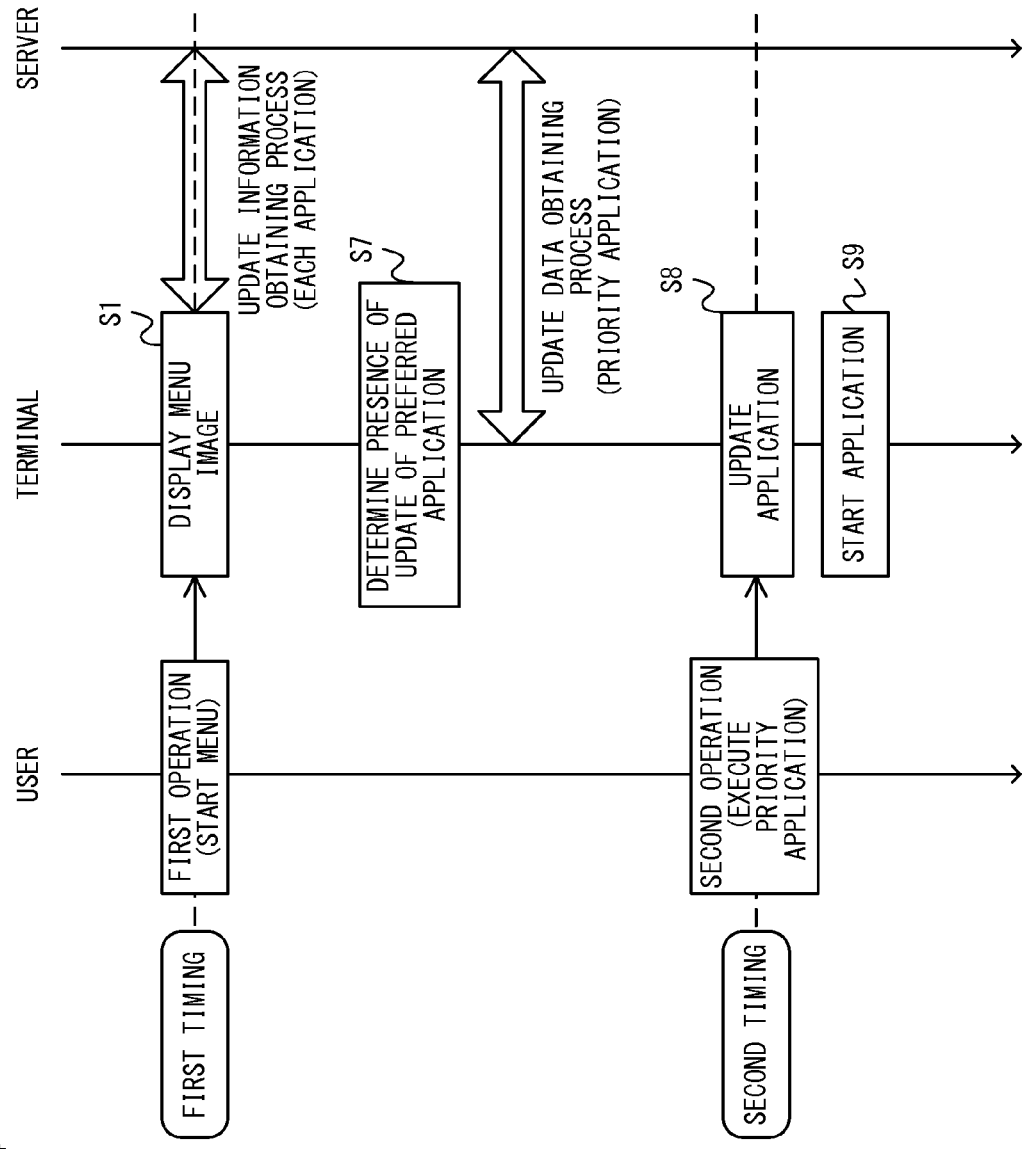
FIG. 4 is a diagram illustrating a non-limiting example of an operation with regard to updating a preferred application.

FIG. 4 is a diagram illustrating an example of an operation with regard to updating a preferred application. In FIG. 4, the update information obtaining process is similar to that in FIG. 2. When the update information obtaining process is completed, the terminal system 3 determines presence of an update of each of one or more preferred applications (step S7). The determination method of the presence of the update is similar to that in case of an application other than the preferred applications. Further, when there are a plurality of preferred applications, the terminal system 3 determines the presence of the update of each preferred application.

When a result of the above determination indicates that the update is present for the preferred application, the terminal system 3 performs the update data obtaining process following the determination process (see FIG. 4). A specific operation of the update data obtaining process is similar to that in case of an application other than the preferred applications. It should be noted that when it has been determined that the update is present for each of a plurality of preferred applications, the terminal system 3 performs the update data obtaining process for each preferred application.

It should be noted that the update data obtaining process for a preferred application may be performed in the background. That is, when another application is executed in the terminal system 3 after the menu image is displayed on the display unit 13, the terminal system 3 may perform the update data obtaining process while the other application is being executed. Accordingly, in the exemplary embodiment, regardless of whether or not another application other than the preferred applications which corresponds to the update data is being executed, the terminal system 3 obtains the update data. Thus, even when the update data for a preferred application is obtained, the user can use another application immediately after the menu image is displayed.

Further, the update data obtaining process for a preferred application may be performed in the background even when the preferred application is being executed. That is, the terminal system 3 may obtain the update data regardless of whether or not the application (may be an application for which the update data is being obtained) is being executed on the information processing apparatus. It should be noted that when the update data obtaining process is performed during a preferred application corresponding to the update data is being executed, the terminal system 3 may update the application using the obtained update data after the preferred application being executed is ended. For example, the application may be updated using the obtained update data at a timing at which the preferred application is started next time.

Further, as shown in FIG. 4, when the second timing arrives for a preferred application, the terminal system 3 updates the preferred application (step S8). That is, when the second operation for starting the preferred application is performed by the user, the terminal system 3 updates the preferred application using the update data. It should be noted that a specific method for updating the preferred application is similar to that in case of an application other than the preferred applications.

After the preferred application is updated, the terminal system 3 executes the preferred application after being updated (step S9). That is, when an instruction to start the preferred application with respect to which it has been determined that the update is present has been issued, the terminal system 3 executes the application onto which the update has been reflected using the update data. Accordingly, also in a case of the preferred application, the user can use a new version (ideally, the latest version) of the application after being updated in the same manner as other applications.

Although a preferred application may be determined in any method, in the exemplary embodiment, an application which is highly likely to be executed (hereafter) is determined to be a preferred application. That is, in the exemplary embodiment, the terminal system 3 obtains, for an application which is highly likely to be executed, the update data in advance before an instruction to start the application is issued. Thus, there is no need to obtain the update data during a time period from an instruction to start the application and execution of the application, and thereby the time period is shortened.

Specifically, in the exemplary embodiment, the preferred applications are applications from the application of the most recent start-up date and time to a predetermined n-th application. That is, the preferred applications are a predetermined number of applications which have been most recently started. This is because presumably recently started applications are highly likely to be executed later again. In another exemplary embodiment, applications which have been executed during a predetermined past period (e.g., during the past one week) may be selected as the preferred applications, for example. Further, for example, applications registered by the user as favorites may be selected as the preferred applications. Further, for example, a predetermined number of applications may be selected in order of frequency of execution or a predetermined number of applications may be selected in order of the length of (accumulated) time of execution as the preferred applications.

In the exemplary embodiment, the preferred applications are determined based on an execution history of each of the applications stored in the storage unit 15. Specifically, in the exemplary embodiment, the terminal system 3 saves date and time each application is started as the execution history, and creates a list (priority list) listing a predetermined number of applications in reverse chronological order. The priority list is updated every time an application is executed. When presence of an update for a preferred application is determined, the terminal system 3 determines the preferred applications based on the priority list.

It should be noted that the preferred application may be determined not necessarily based on the determination method using the execution history but may be determined based on any other method (condition). In another exemplary embodiment, for example, the terminal system 3 may determine applications designated by the user as the preferred applications. Further, for example, the terminal system 3 may determine applications designated by the server 2 as the preferred applications. That is, the server 2 may determine the preferred applications based on degree of urgency of the update data, the degree of importance of the update data, or the like.

As described above, in the exemplary embodiment, the terminal system 3 determines, for an application (preferred application) which satisfies a predetermined condition from among the applications stored in the storage unit 15, whether or not an update is present based on the update information, in response to the update information being obtained and regardless of the second timing. Then, the terminal system 3 obtains, from the server 2, the update data to be used for updating the application with respect to which it has been determined that the update is present (regardless of whether or not the second timing has come). In case of a preferred application, the terminal system 3 need not obtain the update data after an instruction to start the application is issued by the user. Thus, according to the exemplary embodiment, in case of a preferred application, a time period from an instruction to start the application to execution of the application can be shortened.

Further, in the exemplary embodiment, because applications which are highly likely to be executed are determined as the preferred applications, the update data obtained before the second timing arrives is less likely to be left unused (because the application is not started). That is, in the exemplary embodiment, the update data can be obtained efficiently.

Further, in the exemplary embodiment, with respect to some of the applications stored in the storage unit 15, the terminal system 3 may execute the applications always in a state where the latest update has been reflected. That is, with respect to the some of the applications, the terminal system 3 may obtain the update information when each application is started, or may obtain the update data every time each application is started. It should be noted that the some of the applications may be designated by, for example, the server 2.

[3. Details of Process in Information Processing System]
(3-1: Data Used in Information Processing)

In the following, a specific description of processing performed in the information processing system 1 (the terminal system 3) in the exemplary embodiment will be described with reference to FIG. 5 and d FIG. 6. FIG. 5 is a diagram illustrating an example of a data area set in the storage unit 15 of the terminal system 3 in the exemplary embodiment. As shown in FIG. 5, the storage unit 15 of the terminal system 3 includes a program storage area 31 and a data-for-processing storage area 33. It should be noted that, in addition to the data shown in FIG. 5, images to be outputted to the display unit 13, image data used to generate the images, and the like are stored in the storage unit 15.

An information processing program 32 is stored in the program storage area 31. The information processing program 32 is a program to be executed by a computer (the control unit 14) of the terminal system 3. In the exemplary embodiment, the information processing program 32 can be accessed by the control unit 14 and is stored in a program storage unit (a storage apparatus, a storage medium, or the like) provided inside or outside the terminal system 3. A part or the entire information processing program 32 stored in the program storage unit is read and stored in a memory of the control unit 14 at a proper timing and executed by the CPU. Further, the part of or the entire information processing program 32 may be prestored in an information processing apparatus including the control unit 14.

The application 24 executable by the terminal system 3 is stored in the program storage area 31. It should be noted that although only a single application is shown in FIG. 1 and FIG. 5, one or more applications may be stored in the program storage area 31.

Various data used in the information processing (information processing shown in FIG. 6) performed in the terminal system 3 are stored in the data-for-processing storage area 33. The update information 25 and the update data 26 shown in FIG. 1 are stored in the data-for-processing storage area 33. As for the update information 25, only the latest piece (one most recently obtained from the server 2) of information may be stored. As for the update data 26, only a piece of information necessary for executing each application may be stored.

Further, the update version information 34 described above is stored in the data-for-processing storage area 33. Only the latest piece (the most recently obtained from the server 2) of the update version information 34 may be stored. A priority list data 35 is stored in the data-for-processing storage area 33. The priority list data 35 is data representing the priority list listing one or more preferred applications.

(3-2: Specific Example of Information Processing)

Next, a flow of the information processing performed in the exemplary embodiment will be described in detail. FIG. 6 is a flow chart illustrating an example of a flow of the information processing performed by the CPU of the control unit 14 in the exemplary embodiment. In the exemplary embodiment, when the terminal system 3 is started, the CPU of the control unit 14 initializes the memory and the like, and loads the information processing program 32 into the memory from the program storage unit. Then, the CPU starts to execute the information processing program 32.

Figure 6:
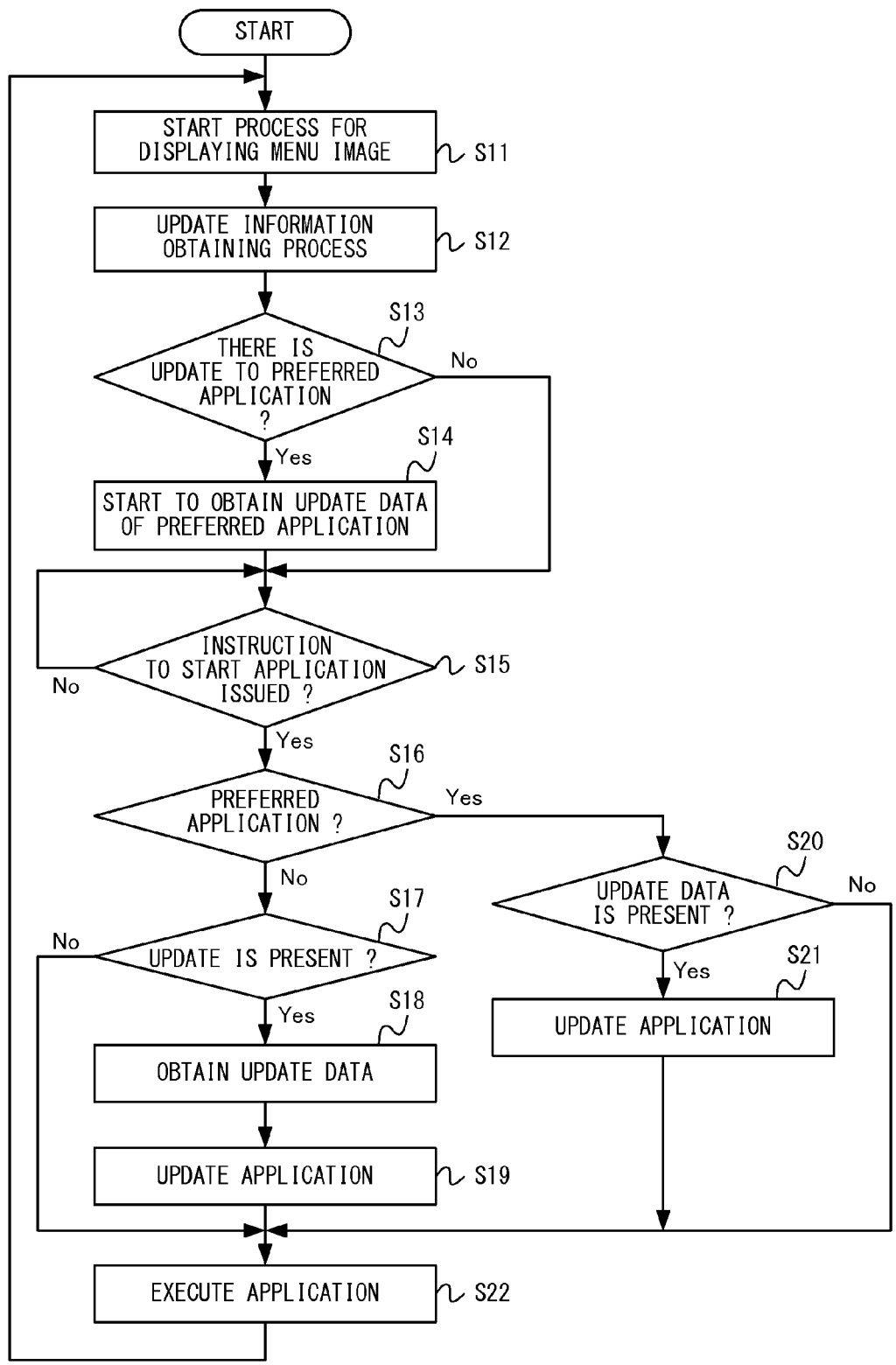
FIG. 6 is a flow chart illustrating a non-limiting example of information processing performed by a CPU of a control unit.

Processes in respective steps in the flow chart shown in FIG. 6 are only examples. The order of the process steps may be interchanged as long as similar results can be obtained. In addition to (or instead of) the above process steps, another process may be performed. Further, in the exemplary embodiment, the respective process steps in the flow chart are performed by the CPU of the control unit 14. However, a part of the process steps may be performed by a processor other than the CPU or a dedicated circuit.

In the exemplary embodiment, the control unit 14 firstly starts a process of displaying the menu image in step S11. In the exemplary embodiment, the process of displaying the menu image started in step S11 may be completed before a process of step S15 described later.

In step S12, the control unit 14 performs an update information obtaining process. The update information obtaining process may be performed in the method described in the above "(2-3: Update Information Obtaining Process)". Specifically, in the update information obtaining process, the control unit 14 obtains the update information 25 from the server 2 via the communication unit 11 and stores the update information 25 in the storage unit 15.

In step S13, the control unit 14 determines presence of an update of a preferred application. In the exemplary embodiment, the control unit 14 reads and refers to the priority list data 35 stored in the storage unit 15, and thereby the preferred application is specified. Then, presence of an update of the specified preferred application is determined based on, for example, the method described in the above "(2-4: Determination of Presence of Update to Application)". When a determination result in step S13 is affirmative, a process of step S14 is performed. Meanwhile, when the determination result is negative, the process of step S14 is skipped and a process of step S15 is performed.

In step S14, the control unit 14 starts the update data obtaining process for the preferred application with respect to which it has been determined that the update is present. It should be noted that even if the preferred application is not started, the obtaining process started in step S14 may be performed in the background subsequently after the process of step S15. In another exemplary embodiment, even when the preferred application is started during the obtaining process, the update data obtaining process may be performed in the background subsequently after the process of step S15. At this time, for example, at a timing at which the preferred application is started after the acquisition of the update data is completed, the application is updated using the obtained update data.

In step S15, the control unit 14 determines whether or not an instruction to start the application has been issued. The process of step S15 is a process for determining whether or not the second timing has come. For example, when the menu image is displayed on the display unit 13 by the process of step S1 and an operation (second operation) for designating an icon of an application contained in the menu image is issued, the control unit 14 determines that the instruction to start the application has been issued. When a determination result in step S15 is affirmative, a process of step S16 is performed. Meanwhile, when the determination result in step S15 is negative, the process of step S15 is performed again. That is, the control unit 14 repeatedly performs the process of step S15 until the instruction to start the application is issued.

In step S16, the control unit 14 determines whether or not the application with respect to which the instruction to start has been issued is a preferred application. It should be noted that the determination in step S16 can be made by reading and referring to the priority list data 35 stored in the storage unit 15. When a determination result in step S16 is negative, a process of step S17 is performed. Meanwhile, when the determination result in step S16 is affirmative, a process of step S20 described later is performed.

In step S17, the control unit 14 determines an presence of an update of the application with respect to which the instruction to start has been issued. That is, the control unit 14 determines the presence of the update based on the method described in the above "(2-4: Determination of Presence of Update to Application)". When a determination result in step S17 is affirmative, a process of step S18 is performed. Meanwhile, when the determination result in step S17 is negative, the process of step S18 and a process of S19 are skipped and a process of step S22 described later is performed.

In step S18, the control unit 14 obtains the update data relative to the application with respect to which the instruction to start has been issued. The control unit 14 obtains the update data from the server 2 based on, for example, the method described in the above "(2-5: Update Data Obtaining Process)". The obtained update data 26 is stored in the storage unit 15.

In step S19, the control unit 14 updates the application with respect to which the instruction to start has been issued. The control unit 14 updates the application based on, for example, the method described in the above "(2-6: Update of Application)". Subsequently to step S19, the control unit 14 performs the process of step S22 described later.

Meanwhile, in step S20, the control unit 14 determines whether or not the update data has been obtained relative to the application with respect to which the instruction to start has been issued. The determination is made, for the application with respect to which the instruction to start has been issued, based on whether or not a piece of update data not used for updating the application is present. Specifically, the control unit 14 determines whether or not the update data has been obtained in the immediately previous step S14. When a determination result in step S20 is affirmative, a process of step S21 is performed. Meanwhile, when the determination result in step S20 is negative, the process of step S21 is skipped and the process of step S22 is performed.

In step S21, the control unit 14 updates the application with respect to which the instruction to start has been issued. The process of step S21 is similar to that of step S19. Subsequently to step S21, the control unit 14, performs the process of step S22.

In step S22, the control unit 14 executes the application with respect to which the instruction to start has been issued. In the exemplary embodiment, because the application is updated as necessary in the process of step S19 or in the process of S21, the new version of the application after being updated is executed. When the application is executed in step S22, the control unit 14 updates the execution history (specifically, start-up date and time) of the application. Further, the control unit 14 updates a content of the priority list data 35 as necessary.

When the application is ended in step S22, the process of step S11 described above is performed. That is, when the application is ended, the menu image is displayed on the display unit 13 again. Then, the process of step S12 is performed again. Accordingly, in the exemplary embodiment, the update information is obtained when the menu image is displayed immediately after the terminal system 3 is started and when the menu image is displayed after the application is ended. It should be noted that, in another exemplary embodiment, the terminal system 3 may obtain the update information only in one of the two cases. This is the end of the description of the processes shown in FIG. 6.

It should be noted that the information processing shown in FIG. 6 is ended in accordance with a predetermined instruction performed by the user. For example, the user may issue an instruction to end the information processing when the menu image is displayed. In this case, when the terminal system 3 is in communication with the server 2 (for example, for obtaining the update information or the update data), the information processing shown in FIG. 6 may be ended after the terminal system 3 completes the communication, for example.

[4. Modification]

(Process when Shifting to Non-Use Mode)

Further, in another exemplary embodiment, when the terminal system 3 has a non-use mode, processes with regard to an update (processes of obtaining the update information, obtaining the update data, and the like) may be performed at a timing at which the mode is shifted to the non-use mode. At this time, the non-use mode is a state where the terminal system 3 is not used by the user, and is, for example, a so-called sleep mode. It should be noted that the non-use mode may be a mode (power saving mode) in which the display device is switched OFF. Further, for example, when the terminal system 3 includes an information processing apparatus which is openable and closable (foldable), the mode may be shifted to the non-use mode while the information processing apparatus is in a closed state. In the exemplary embodiment, while in the non-use mode, no input other than an input of an instruction to shift to a use mode is accepted, and a predetermined process is performed in the terminal system 3. For example, the terminal system 3 shifts to the non-use mode subject to the user's instruction to shift to the non-use mode. Further, for example, the terminal system 3 shifts to the non-use mode subject to the user's input not having been performed for a predetermined time period in the use mode.

The second timing may be a timing in response to the terminal system 3 having shifted to the non-use mode. That is, in response to the terminal system 3 having shifted to the non-use mode, the control unit 14 may determine presence of an update of an application. More specifically, the control unit 14 determines whether a condition (for example, that a user operation for shifting to the non-use mode is performed, that no user input is performed for a predetermined time period, or the like) is satisfied. When the condition is satisfied, the control unit 14 determines the presence of the update. Then, the control unit 14 may obtain the update data for the application with respect to which it has been determined that the update is present, and may further update the application.

At this time, the application with respect to which the presence of the update is determined may be any application, and may be selected based on, for example, the above-described execution history of the application. That is, the terminal system 3 may generate a list of the following applications based on respective execution histories in the same manner as the priority list described in "(2-7: Process of Obtaining Update Data at Another Timing)", and may determine presence of an update of each application listed in the generated list.

A predetermined number (may be one or more) of applications having been the most recently started.

Applications executed during a predetermined past time period (e.g., during the past one week).

A predetermined number of applications in order of frequency of execution.

A predetermined number of applications in order of the length of (accumulated) time of execution.

Further, the application with respect to which presence of an update is determined may be, other than the above applications, an application registered as a favorite by the user, or may be an application designated by the server 2. Further, the application with respect to which the presence of the update is determined may be each of (all of) the applications stored in the terminal system 3.

According to the above, in the same manner as the exemplary embodiment, the terminal system 3 can perform the update information obtaining process and the update data obtaining process at separate timings, and thereby efficiently confirm an presence of an update of each application and (when the update is present) obtain the update data. Further, in a case where the application with respect to which presence of an update is determined at the second timing is selected based on the execution history, the update data for an application which is highly likely to be used can be obtained. Thus it is made possible to obtain the update data efficiently. Further, according to the above, while the terminal system 3 obtains the update information for a plurality of applications collectively at one time, the presence of the update is determined for a part of the plurality of applications. Accordingly, the determination process can be performed efficiently in the same manner as the above exemplary embodiment.

Further, the terminal system 3 may determine presence of an update at a timing, as the second timing, at which an application is started (a timing after the update information is obtained in case of a preferred application) as described in the exemplary embodiment and also a timing in response to the terminal system 3 having shifted to the non-use mode. Accordingly, it is made easier for the terminal system 3 to obtain the latest update data and keep the application up-to-date.

In another exemplary embodiment, the terminal system 3 may obtain the update information at, in addition to (or instead of) the timing at which the menu image is displayed as described in the exemplary embodiment, at a timing at which the terminal system 3 shifts to the non-use mode. That is, when the terminal system 3 shifts to the non-use mode, the terminal 3 may firstly perform the update information obtaining process. Then, the terminal system 3 may perform the process for determining the presence of the update as described above by using the obtained update information. Accordingly, it is made easier for the terminal system 3 to obtain the latest update information and keep the application up-to-date.

Further, in another exemplary embodiment, the terminal system 3 may perform the update information obtaining process and the process for determining the presence of the update (and the updating process) repeatedly at fixed time intervals in the non-use mode. Accordingly, the frequency of performing the process of determining presence of an update is increased and thereby it is made easier to keep the application up-to-date.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the objective of the exemplary embodiment is such as to update an application efficiently, and the exemplary embodiment can be used as, for example, an information processing apparatus, a terminal system, and the like which execute an application.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus comprising at least one processor and configured to communicate with a server via a network, the information processing apparatus configured to:
   obtain update information from the server at a first timing independent of and prior to a second timing, wherein the second timing is in response to an issuance of an instruction to start at least one application stored in a storage device accessible by the information processing apparatus, and wherein the obtained update information indicates a presence of an update on the server for the at least one application stored in the storage device;
   save the obtained update information in the storage device;
   determine for the at least one application stored in the storage device whether there is an update present on the server at the second timing based on the saved update information, wherein the second timing is independent of and after the first timing;
   obtain from the server update data used for updating the at least one application responsive to the information processing apparatus determining that the update is present;
   save the obtained update data in the storage device;
   update the at least one application using the saved update data; and
   start the at least one application.

2. The information processing apparatus according to claim 1, further configured to:
   determine whether the first timing has come based on whether a first condition is satisfied;
   determine whether the second timing has come based on whether a second condition different from the first condition is satisfied; and
   make a determination when the second timing has come.

3. The information processing apparatus according to claim 1, further configured to:
   obtain update information for determining presence of updates of a plurality of applications from the server; and
   determine whether there is an update to one of the applications from the plurality of applications.

4. The information processing apparatus according to claim 1, wherein
   the first timing is caused by a user performing a first operation, and
   the second timing is caused by the user performing a second operation different from the first operation.

5. The information processing apparatus according to claim 1, wherein
   the first timing is between start-up of the information processing apparatus and issuance of an instruction to start the application stored in the storage device.

6. The information processing apparatus according to claim 1, wherein
   the first timing is based on a process of displaying a menu image with which a user can issue an instruction to start the application stored in the storage device.

7. The information processing apparatus according to claim 1, further configured to:
   obtain the update data before the application is started.

8. The information processing apparatus according to claim 1, further configured to:
   obtain and save update information together with update version information representing a version of the update information; and when a third timing arrives for determining presence of the update, obtain the update version information from the server and determine whether or not to obtain the update information based on the obtained update version information.

9. The information processing apparatus according to claim 1, wherein
update information is obtained for one or more applications set in the server regardless of whether the applications are stored in the storage device.

10. The information processing apparatus according to claim 1, further configured to:
obtain the update information from the server which can provide the information processing apparatus with at least one of the update data and an application executable by the information processing apparatus.

11. The information processing apparatus according to claim 1, further configured to:
determine, in response to update information having been obtained and regardless of whether the second timing has come, whether there is an update to an application which satisfies a predetermined condition among the applications stored in the storage device, based on the update information; and
obtain, from the server, update data used for updating the application with respect to which the determination has been made that the update is present.

12. The information processing apparatus according to claim 11, wherein
an application which satisfies the predetermined condition is determined based on an execution history of each application stored in the storage device.

13. The information processing apparatus according to claim 11, wherein
update data is obtained regardless of whether an application other than an application corresponding to the update data is being executed in the information processing apparatus.

14. The information processing apparatus according to claim 1, further configured to:
obtain update information for determining presence of updates of a plurality of applications from the server; and
determine whether there is an update to each of a part of the plurality of applications represented by the update information.

15. The information processing apparatus according to claim 1, wherein
the second timing is in response to the information processing apparatus having shifted to a non-use mode.

16. The information processing apparatus according to claim 15, further configured to:
determine whether there is an update to each of one or more applications selected, based on the respective execution histories stored in the storage device, from among the applications stored in the storage device which can be accessed by the information processing apparatus.

17. The information processing apparatus according to claim 1, wherein
the first timing is in relation to a menu image being displayed on a display of the information processing apparatus.

18. The information processing apparatus according to claim 1, wherein
the first timing is in relation to a start-up process of the information processing apparatus, and the second timing is in relation to a selection operation performed with respect to at least one application from the applications stored in the storage device.

19. A terminal system configured to communicate with a server via a network, comprising:
a processing system having at least one processor, the processing system configured to:
obtain update information from the server at a first timing independent of and prior to a second timing, wherein the second timing is in response to an issuance of an instruction to start at least one application stored in a storage device accessible by the processing system, and wherein the obtained update information indicates a presence of an update on the server for the at least one application stored in the storage device, and save the obtained update information in the storage device;
determine for the at least one application stored in the storage device whether there is an update present on the server at the second timing based on the saved update information, wherein the second timing is independent of and after the first timing;
obtain from the server update data used for updating the at least one application responsive to the processing system determining that the update is present;
save the obtained update data in the storage device;
update the at least one application using the saved update data; and
start the at least one application.

20. A non-transitory computer-readable storage medium comprising an information processing program to be executed by a computer of an information processing apparatus configured to communicate with a server via network, the information processing program causing the computer to:
obtain update information from the server at a first timing independent of and prior to a second timing, wherein the second timing is in response to an issuance of an instruction to start at least one application stored in a storage device accessible by the information processing apparatus, and wherein the obtained update information indicates a presence of an update on the server for the at least one application stored in the storage device, and save the obtained update information in the storage device;
determine for the at least one application stored in the storage device whether there is an update present on the server at the second timing based on the saved update information, wherein the second timing is independent of and after the first timing;
obtain from the server update data used for updating the at least one application responsive to the information processing apparatus determining that the update is present;
save the obtained update data in the storage device;
update the at least one application using the saved update data; and
start the at least one application.

21. A method of obtaining update data for an application to be executed in a terminal system configured to communicate with a server via a network, the method comprising:
obtaining update information from the server at a first timing independent of and prior to a second timing, wherein the second timing is in response to an issuance of an instruction to start at least one application stored in a storage device accessible by the terminal system, and wherein the obtained update information indicates a presence of an update on the server for the at least one application stored in the storage device, and saving the obtained update information in the storage device;

determining for the at least one application stored in the storage device whether there is an update present on the server at the second timing based on the saved update information, wherein the second timing is independent of and after the first timing;

obtaining from the server update data used for updating the at least one application responsive to the terminal system determining that the update is present;

saving the obtained update data in the storage device;

updating the at least one application using the saved update data; and starting the at least one application.

\* \* \* \* \*